(12) United States Patent
Lee et al.

(10) Patent No.: US 10,057,840 B2
(45) Date of Patent: Aug. 21, 2018

(54) METHOD FOR SEARCHING BASE STATION IN PLURALITY OF COMMUNICATION SYSTEMS AND APPARATUS FOR SAME

(71) Applicant: LG Electronics Inc., Seoul (KR)

(72) Inventors: Eunjong Lee, Seoul (KR); Hyeyoung Choi, Seoul (KR); Heejeong Cho, Seoul (KR); Genebeck Hahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 149 days.

(21) Appl. No.: 14/778,295

(22) PCT Filed: Apr. 3, 2014

(86) PCT No.: PCT/KR2014/002884
§ 371 (c)(1),
(2) Date: Sep. 18, 2015

(87) PCT Pub. No.: WO2014/163411
PCT Pub. Date: Oct. 9, 2014

(65) Prior Publication Data
US 2016/0353360 A1    Dec. 1, 2016

Related U.S. Application Data

(60) Provisional application No. 61/807,774, filed on Apr. 3, 2013.

(51) Int. Cl.
*H04W 48/16* (2009.01)
*H04W 76/27* (2018.01)
(Continued)

(52) U.S. Cl.
CPC ............. *H04W 48/16* (2013.01); *H04L 41/06* (2013.01); *H04W 72/085* (2013.01);
(Continued)

(58) Field of Classification Search
None
See application file for complete search history.

(56) References Cited

U.S. PATENT DOCUMENTS

2010/0062764 A1    3/2010  Aiouaz et al.
2010/0118720 A1*   5/2010  Gauvreau ........... H04W 72/048
                                                      370/252
(Continued)

FOREIGN PATENT DOCUMENTS

CN    1710986 A    12/2005
CN    101931984 A  12/2010
(Continued)

OTHER PUBLICATIONS

XP031876272; German Castignani et al: "Cross-Layer Adaptive Scanning Algorithms for IEE 802.11 Networks".

*Primary Examiner* — Chi H Pham
*Assistant Examiner* — Raul Rivas
(74) *Attorney, Agent, or Firm* — Dentons US LLP

(57) ABSTRACT

The present invention relates to a wireless communication system. Particularly, a method by which a terminal scans a base station in a plurality of communication systems, according to one embodiment of the present invention, can comprises the steps of: receiving, by the terminal connected to a first communication system, information on at least one second base station of a second communication system from a first base station of the first communication system; receiving, from the first base station, a scanning request message requesting to scan at least one second base station if a scanning start condition is satisfied, receiving; scanning at least one second base station on the basis of the scanning request message; and transmitting, to the first base station, a failure reporting message including information on the cause of a scanning failure if the result from the scanning step is failure.

11 Claims, 16 Drawing Sheets

(51) Int. Cl.
*H04L 12/24* (2006.01)
*H04W 72/08* (2009.01)
*H04W 76/04* (2009.01)
*H04W 88/02* (2009.01)
*H04W 88/08* (2009.01)

(52) U.S. Cl.
CPC ......... *H04W 76/046* (2013.01); *H04W 76/27* (2018.02); *H04W 88/02* (2013.01); *H04W 88/08* (2013.01)

(56) References Cited

U.S. PATENT DOCUMENTS

| | | | |
|---|---|---|---|
| 2010/0189073 A1* | 7/2010 | Gandham | H04L 29/12283 370/331 |
| 2011/0243066 A1* | 10/2011 | Nayeb Nazar | H04L 1/007 370/328 |
| 2012/0302241 A1 | 11/2012 | Klingenbrunn et al. | |
| 2012/0315895 A1* | 12/2012 | Jovanovic | H04W 36/0083 455/424 |
| 2013/0252608 A1 | 9/2013 | Lee et al. | |
| 2013/0272255 A1* | 10/2013 | Zhu | H04B 7/0486 370/329 |
| 2014/0241298 A1* | 8/2014 | Park | H04L 5/001 370/329 |

FOREIGN PATENT DOCUMENTS

| | | |
|---|---|---|
| JP | 2008092509 A | 4/2008 |
| JP | 2009088603 A | 4/2009 |
| WO | 2012074336 | 6/2012 |
| WO | 2014129811 A1 | 8/2014 |

\* cited by examiner

METHOD FOR SEARCHING BASE STATION IN PLURALITY OF COMMUNICATION SYSTEMS AND APPARATUS FOR SAME

This application is a 35 USC § 371 National Stage entry of International Application No. PCT/KR2014/002884 filed on Apr. 3, 2014, and claims priority to U.S. Provisional Application No. 61/807,774 filed on Apr. 3, 2013, all of which are hereby incorporated by reference in their entireties as if fully set forth herein.

TECHNICAL FIELD

The present invention relates to a wireless communication system, and more particularly, to a method of searching for a base station in a plurality of communication systems and an apparatus therefor.

BACKGROUND ART

In a wireless communication system, there may be multi-RAT user equipment (UE) with capability for access to two or more radio access technologies (RATs). In order to access specific RAT, connection is established to specific RAT and data is transmitted and received based on UE request. However, even if the multi-RAT UE has capability of accessing two or more RATs, the multi-RAT UE cannot simultaneously access multiple RATs. That is, currently, even if a UE has multi-RAT capability, the UE cannot simultaneously transmit and receive data through different RATs.

Since it is not necessary for a legacy multi-RAT technology to have interworking between a wireless LAN and a cellular network, there is a problem in that overall system efficiency is low. Moreover, although a UE has capability of accessing multiple RATs at the same time, it is able to access multiple RATs at the same time in a manner of supporting flow mobility/IP-flow mapping in a network level only without a control in a radio level. For this reason, a legacy technology does not request any control connection between an AP and a cellular network and has been in progress based on a request of the user equipment.

Yet, since the legacy technology is unable to identify a precise situation of a network and selects a UE-oriented RAT, there exists a limit for enhancing overall network efficiency. In particular, since a UE is capable of accessing a plurality of communication systems, it is necessary to have methods for efficiently scanning a base station of a specific communication system. However, a study on the methods has not been performed yet.

DISCLOSURE OF THE INVENTION

Technical Task

A technical task of the present invention is to provide a method of searching for a base station in a plurality of communication systems and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of searching for a base station by a user equipment in a plurality of communication systems, comprising: receiving, by a user equipment accessed a first communication system, information on at least one or more second base stations of a second communication system from a first base station of the first communication system, when a search start condition is satisfied, receiving a search request message for requesting to search for the at least one or more second base stations from the first base station, searching for the at least one or more second base stations based on the search request message, and when a result of the searching step corresponds to a failure, transmitting a failure report message including information on a cause of a search failure to the first base station.

To further achieve these and other advantages and in accordance with the purpose of the present invention, according to a different embodiment, a user equipment searching for a base station in a plurality of communication systems includes a Radio Frequency (RF) unit and a processor, wherein the processor configured a user equipment, which has accessed a first communication system, to receive information on at least one or more second base stations of a second communication system from a first base station of the first communication system, receive a search request message for making a request for searching for the at least one or more second base stations from the first base station when a search start condition is satisfied, search for the at least one or more second base stations based on the search request message and to transmit a failure report message including information on a cause of a search failure to the first base station when a result of the searching step corresponds to a failure.

Following items can be commonly applied to the embodiments according to the present invention.

The information on the cause is selected from a first cause to a third cause, the first cause corresponds to a beacon search failure, the second cause corresponds to base station inaccessibility and the third cause corresponds to weak signal strength.

When the information on the cause corresponds to the first cause, the user equipment can transmit an identifier of a base station associated with a beacon search failure to the first base station.

When the information on the cause corresponds to the second cause, the user equipment select one from sub causes containing a 2-1 sub cause, a 2-2 sub cause and a 2-3 sub cause and may be able to transmit the selected sub cause. The 2-1 sub cause corresponds to non-existence of security information, the 2-2 sub cause corresponds to non-existence of a channel capable of being supported and the 2-3 sub cause may correspond to no synchronization.

When the information on the cause corresponds to the third cause, the user equipment can transmit signal strength measured for each of the at least one or more second base stations.

When the search request message is received, the user equipment initiates a search failure timer and when search is not successful until the search failure timer is expired, the user equipment may transmit the failure report message to the first base station.

The search request message can include information on a maximum number of search retry.

When a number of transmitting the failure report message exceeds the maximum number of search retry, it is able to receive a search stop message from the first base station.

When the result of the searching step corresponds to a success, the method can further comprises transmitting a search result report message to the first base station.

The search result report message can include at least one of an identifier of a base station, a signal measurement value and base station center frequency information.

The search request message can include a 1-bit indicator indicating whether a search failure is reported.

The search request message can be transmitted using RRC (radio resource control) signaling.

It is to be understood that both the foregoing general description and the following detailed description are exemplary and explanatory and are intended to provide further explanation of the invention as claimed.

Advantageous Effects

According to embodiments of the present invention, in order to enable a user equipment to efficiently use a wireless LAN (WLAN) via controlling of a cellular network in a wireless communication system, it is able to effectively search for an access point (AP) of the wireless LAN according to an indication of the cellular network.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
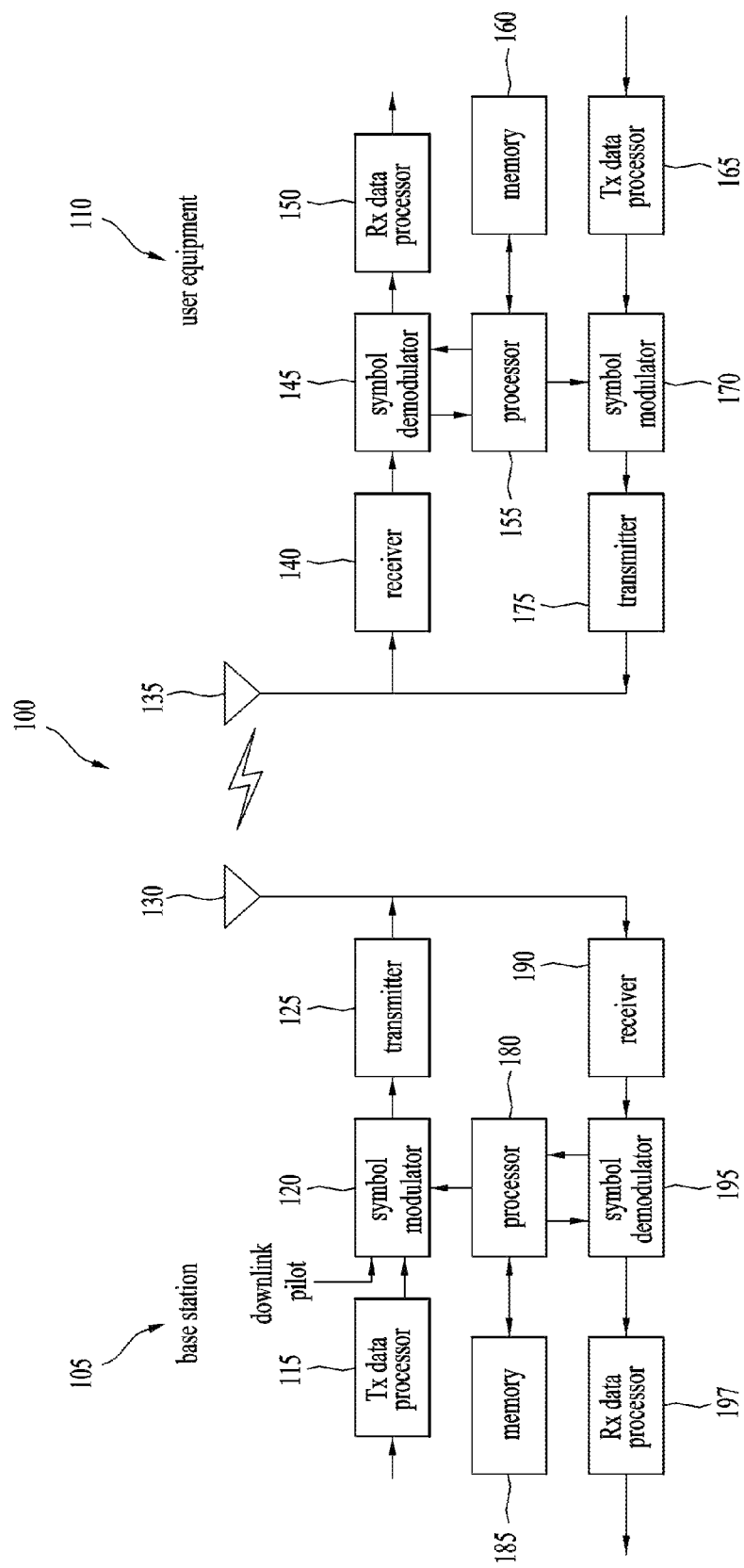
FIG. 1 is a block diagram for a configuration of a base station 105 and a user equipment 110 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on 3GPP LTE system or 3GPP LTE-A system, contents of the present invention may be applicable to various kinds of other communication systems.

In a mobile communication system, a user equipment is able to receive information in downlink and is able to transmit information in uplink as well. Informations transmitted or received by the user equipment node may include various kinds of data and control informations. In accordance with types and usages of the informations transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 2:
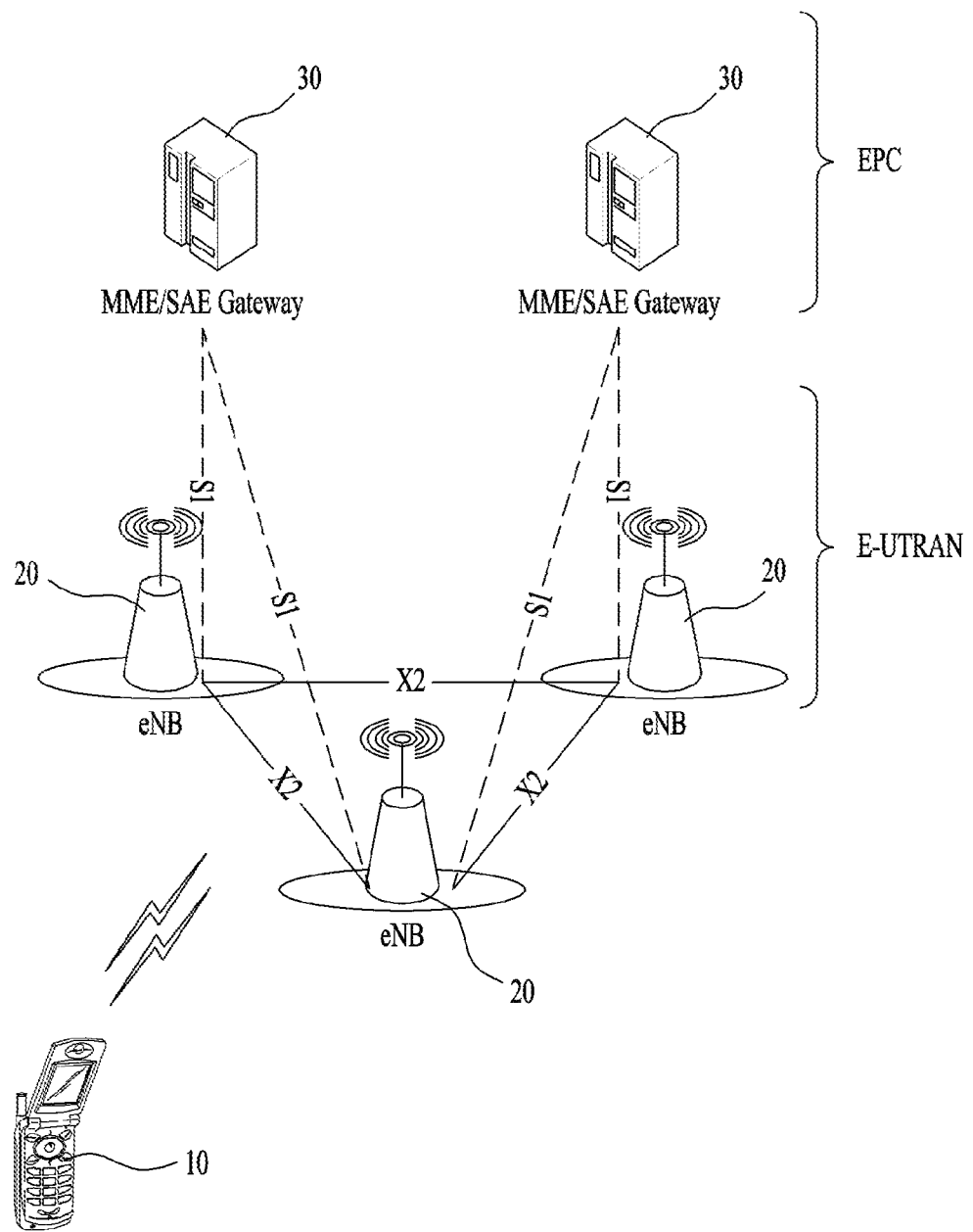
FIG. 2 is a diagram for an example of a network structure for Evolved Universal Mobile Telecommunications System (E-UMTS)

FIG. 2 is a diagram illustrating a structure of a network of an evolved universal mobile telecommunications system (E-UMTS).

The E-UMTS may also be referred to as an LTE system. The system may be broadly arranged in order to provide various communication services such as voice ALV packet data and in general, may be configured to be enabled based on various technologies that will be described and disclosed in detail with reference to the following diagrams.

Referring to FIG. 2, the E-UMTS network includes an evolved UMTS terrestrial radio access network (E-UTRAN), an evolved packet core (EPC), and one or more UEs 10. The E-UTRAN includes one or more BSs 20. With regard to the EPC, an MME/SAE gateway 30 provides an end point of a session and a mobility control function to the UE 10. The BS 20 and the MME/SAE gateway 30 may be connected through an S1 interface.

The UE 10 may be an apparatus brought by a user and may also be referred to as a mobile station (MS), a user terminal (UT), a subscriber station (SS), or a wireless apparatus.

In general, the BS 20 is a fixed station that communicates with the UE 10. The BS 20 may also be referred to as an access point (AP) as well as a base station. A BS provides end points of a user plane and a control plane to a UE. In general, the BS is configured to include a transmitter and a processor among other components and to be operated according to various technologies stated in the specification.

A plurality of UEs 10 may be positioned in one cell. In general, one BS 20 is arranged in each cell. An interface for transmission of user traffic or control traffic may be used between the BSs 20. In this specification, "downlink" refers to communication to the UE 10 from the BS 20 and "uplink" refers to communication to the BS 20 from the UE 10.

The MME/SAE gateway 30 provides various functions including distribution of paging messages, security control, idle state mobility control, SAR bearer control, and ciphering and integrity protection of non-access stratum (NAS) signaling to the BSs 20. The SAE gateway 30 provides various functions including termination of U-plan packets for paging reasons and switching of U-plan for supporting UE mobility. For convenience of description, the MME/SAE gateway 30 may also be referred to as a "gateway" in the specification. However, this structure may be interpreted as including both an MME gateway and a SAE gateway.

A plurality of nodes may be connected between the BS 20 and the gateway 30 through an S1 interface. The BSs 20 may be connected to each other through an X2 interface and neighbor BSs may have a meshed network structure with an X2 interface.

Figure 3A:
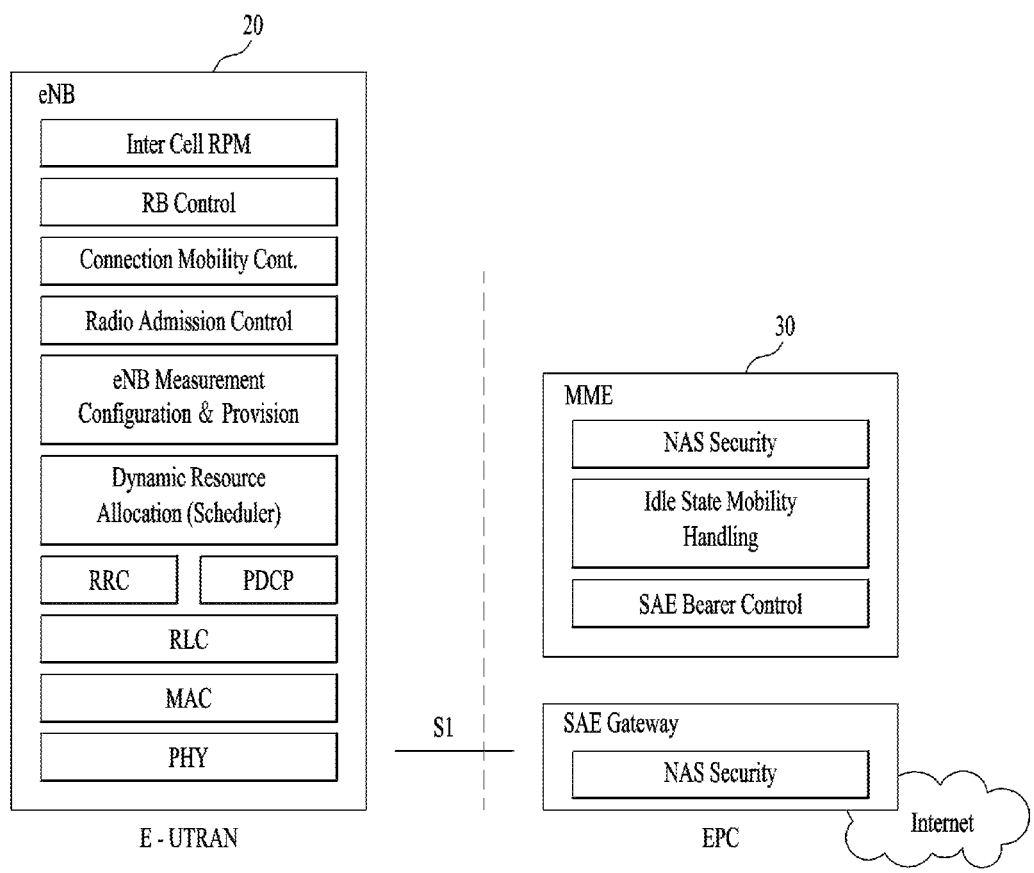
FIG. 3a is a block diagram for a general structure of general evolved UMTS terrestrial radio access network (E-UTRAN) and general evolved packet core (EPC)

FIG. 3A is a block diagram illustrating general structures of general E-UTRAN and general EPC.

Referring to FIG. 3A, the BS 20 may perform functions of selection for the gateway 30, routing toward a gateway while radio resource control (RRC) is enabled, scheduling and transmission of paging messages, scheduling and transmission of broadcasting channel (BCCH) information, dynamic allocation of a resource to the UEs 10 in downlink and uplink, configuration and provisioning of BS measurements, wireless bearer control, radio admission control (RAC), and connection mobility control in an LTE_ACTIVE state.

As described above, in the EPC, the gateway 30 may perform functions of paging origination, LTE_IDLE state control, ciphering of a user plane, SAE barer control, and integrity protection of non-access stratum (NAS) signaling.

Figure 3B:
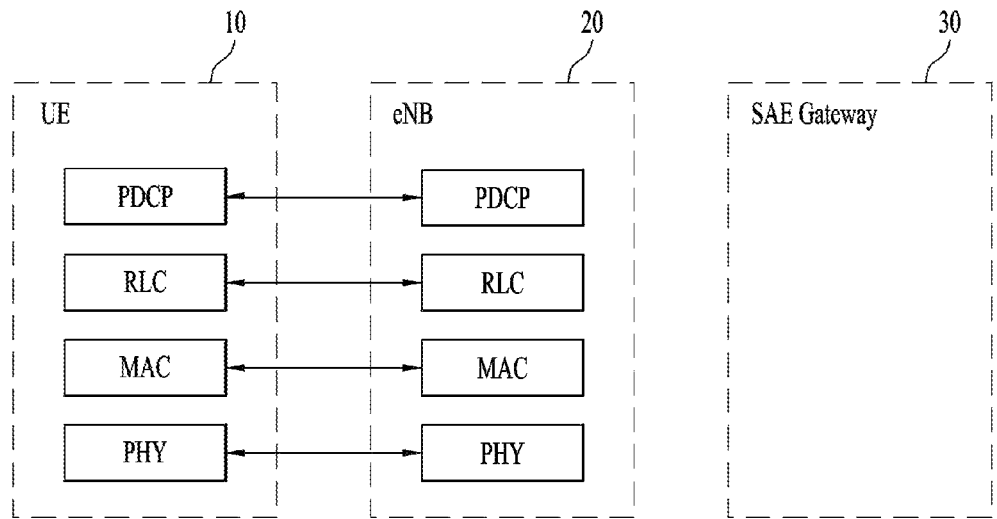
FIGS. 3b and 3c are block diagrams for a user plane protocol and a control plane protocol for E-UMTS network.
Figure 3C:
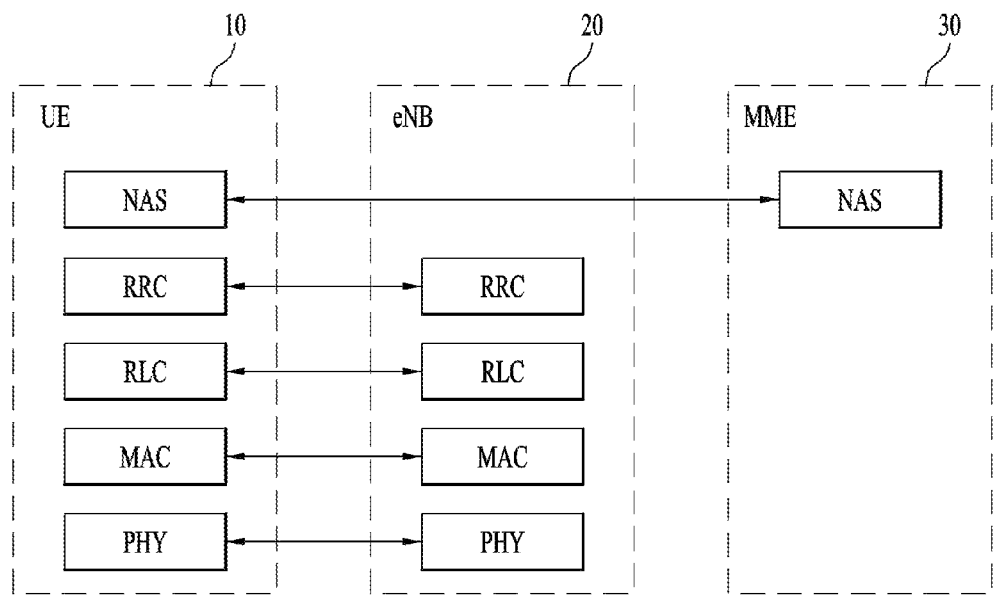

FIGS. 3B and 3C are block diagrams illustrating user plane protocol and control plane protocol stack for an E-UMTS network.

Referring to FIGS. 3B and 3C, protocol layers may be classified into a first layer L1, a second layer L2, and a third layer L3 based on three lower layers of an open system interconnection (OSI) standard model.

The first layer L1 (or a physical layer (PHY)) provides an information transfer service to a higher layer using a physical channel. The PHY is linked to a medium access control (MAC) layer positioned in a higher layer through a transport channel. Data between the MAC layer and the PHY is transmitted through the transport channel. Data between different PHYs, i.e., between PHYs of a transmitter and a receiver (e.g., between PHYs of the UE 10 and the BS 20) is transmitted through a physical channel 21.

The MAC layer of the second layer L2 provides a service to a radio link control (RLC) layer corresponding to a higher layer through a logical channel. The MAC layer of the second layer L2 supports reliable data transmission. The RLC layer illustrated in FIGS. 3B and 3C is illustrated as the RLC layer is not necessary when MAC RLC functions are implemented and are performed in the MAC layer. Referring to FIG. 3B, a packet data convergence protocol (PDCP) layer of the second layer L2 performs a header compression function of reducing unnecessary control information to efficiently transmit an IP packet such as IPv4 or IPv6 in a radio interface having a narrow bandwidth.

Referring to FIG. 3C, an RRC layer of the third layer L3 corresponding to the lowest of three layers is defined only in the control plane. The RRC layer controls logical channels, transport channels and physical channels with respect to configuration, reconfiguration and release of radio bearers (RBs). Here, RBs refers to a service provided by the second layer L2 for data transmission between a UE and an E-UTRAN.

Referring to FIG. 3B, the RLC and MAC layers (which are terminated in the BS 20 in a network) perform functions such as scheduling, automatic repeat request (ARQ), and hybrid automatic repeat request (HARQ). The PDCP layer (which is terminated in the BS 20 in a network) may perform a user plane function such as header compression, integrity protection, and ciphering.

Referring to FIG. 3C, the RLC and MAC layers (which are terminated in the BS 20 in a network) perform the same functions as in a control plane. As exemplified above, the RRC layer (which is terminated in the BS 20 in a network) may perform functions such as broadcasting, paging, RRC connection control, radio bearer (RB) control, mobility function, and UE measurement report and control. A NAS control protocol terminated in the MME gateway 30 in a network may perform a function such as SAE bearer control, authentication, LTE_IDLE mobility handling, paging start in LTE_IDLE, and security control for signaling between gateways and the UE 10.

The NAS control protocol may user three different states: first, LTE_DETACHED state in which there is no RRC entity, second, LTE_IDLE state in which there is no RRC connection but minimum UE information is stored, and third, LTE_ACTIVE state in which RRC connection is established.

The RRC state may be classified into two different states such as RRC_IDLE and RRC_CONNECTED. In the RRC_IDLE state, the UE 10 may receive broadcasting of paging information and system information, specifies discontinuous reception (DRX) configured with NAS, and is allocated with an identifier (ID) for uniquely identifying the UE 10 in a tracking region. In addition, in the RRC_IDLE state, there is no context stored in the BS 20.

In the RRC_IDLE state, the UE 10 specifies a paging DRX cycle. In particular, the UE 10 monitors a paging signal in the case of specific paging of each UE-specific paging DRX cycle.

In the RRC_CONNECTED state, the UE 10 includes E-UTRAN RRC connection and context in the E-UTRAN and transmits and/or receives data to/from an available network (BS). In addition, the UE 10 may report channel quality information and feedback information to the BS 20.

In the RRC_CONNECTED state, the E-UTRAN knows a cell to which the UE 10 belongs. Accordingly, a network may transmit/receive data to/from the UE 10, control mobility (handover) of the UE 10, and perform cell measurement on a neighbor cell.

Figure 4A:
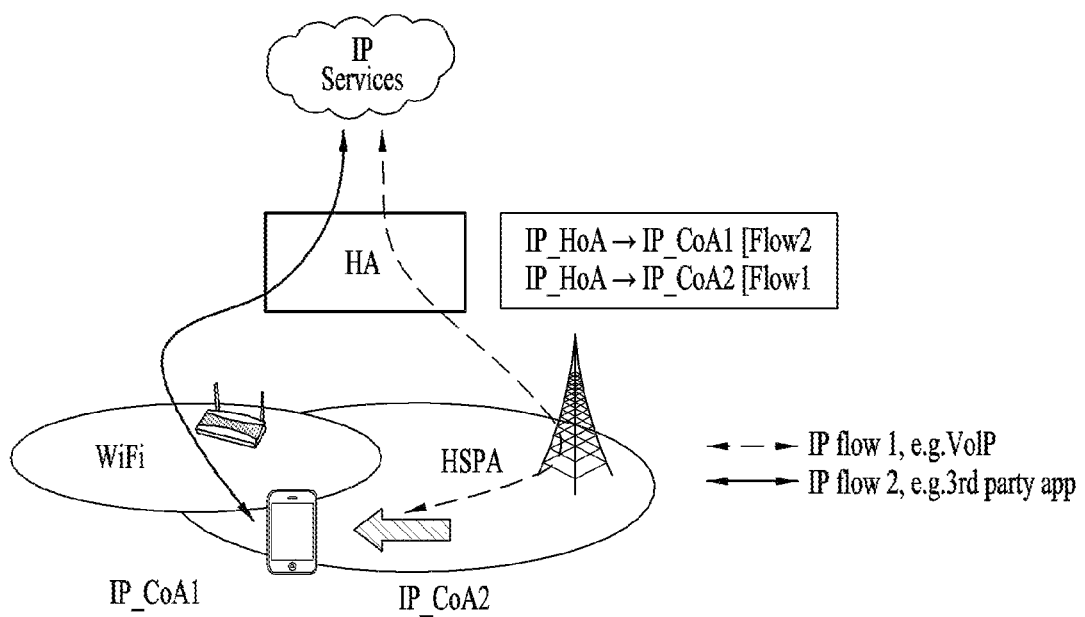
FIG. 4a is an exemplary diagram for explaining IP flow-based Wi-Fi mobility.

FIG. 4a is an exemplary diagram for explaining IP flow-based Wi-Fi mobility.

IFOM (IP Flow Mobility)

3GPP (Rel-10) standard describes 3G/WiFi Seamless Offload including a WLAN offloading technology in a DSMIPv6-based IP flow unit, a DSMIPv6 (dual stack mobile Iv6) UE and a solution supporting IPv4 and IPv6 at the same time in a network. As a mobile communication network is diversified, IPv6 adoption is extended and mobility support is magnified as a core technology. Hence, mobility support is also required by a legacy IPv4 network and the legacy IPv4 network also adopts DSMIPv6. And, a client-based MIP technology is provided to enable a user to detect a movement of the user equipment and inform an agent of the movement of the user equipment. An HA corresponds to an agent managing mobility of a mobile node. There exist a flow binding table and a binding cache table. In case of using PMIPv6, due to a technical problem having difficulty in managing in an IP flow unit, IFOM uses DSMIPv6 only.

MAPCON (Multi Access PDN Connectivity)

This technology corresponds to a technology having multiple PDN connectivity with APNs different from each other at the same time and a protocol independent technology. This technology can use PMIPv6, GTP and DSMIPv6.

All of data flows, which used to be transmitted via a single PDN, move using the technology.

Figure 4B:
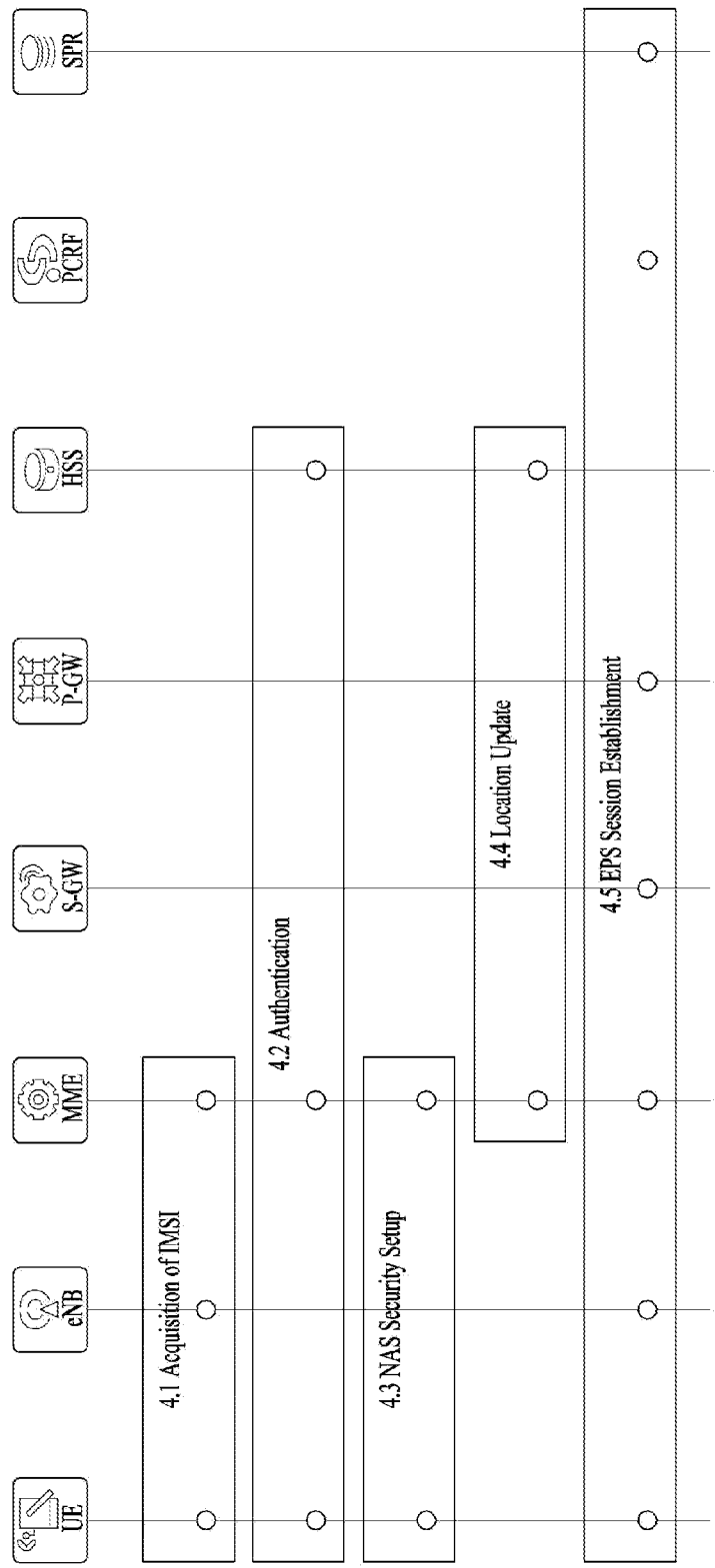
FIG. 4b is a simple diagram for explaining an initial access procedure of a user equipment in LTE system.

FIG. 4b is a simple diagram for explaining an initial access procedure of a user equipment in LTE system.

FIG. 4b shows a flow of an LTE initial attach (initial access) procedure centering on a representative message and a parameter and shows a part of 3GPP standard call flow only. As shown in FIG. 4b, the LTE initial attach procedure can be mainly classified into 5 steps.

1. Acquisition of IMSI: A step for an LTE network (MME) to acquire an IMSI value of a UE (UE ID acquisition step)

2. Authentication: A step for a UE to authenticate LTE network and the step for the LTE network (MME) to authenticate the UE (user authentication step)

3. NAS security setup: If mutual authentication is completed, in order to protect a message transceived between UE and MME in a radio section, it may prepare for "encryption & integrity protected". If this step is completed, a NAS message (a message between the UE and the MME) can be protected in a radio section. (Protection enables a strange person not to read or modulate a message in a radio section)

4. Location update: A step of registering an MME to which a UE is attached at a HSS and delivering a service profile (QoS profile) subscribed by the UE to the MME by the HSS 5. EPS session establishment: A step of assigning an IP address to a UE and generating an EPS bearer (a DRB tunnel between the UE and an eNB, an S1 GTP tunnel between the eNB and an S-GW, an S5 GTP tunnel between the S-GW and a P-GW) to be used by the UE. When the EPS bearer is generated, a QoS parameter of the EPS bearer is configured based on a QoS profile determined by a PCRF.

The UE ID acquisition and the EPS session establishment correspond to procedures performed in all initial attachment steps. The second, the third and the fourth procedure are performed in a manner of being impacted by a type of a UE ID (IMSI or old GUTI) and information on whether previous user access information is left in a network (MMEs).

Figure 5:
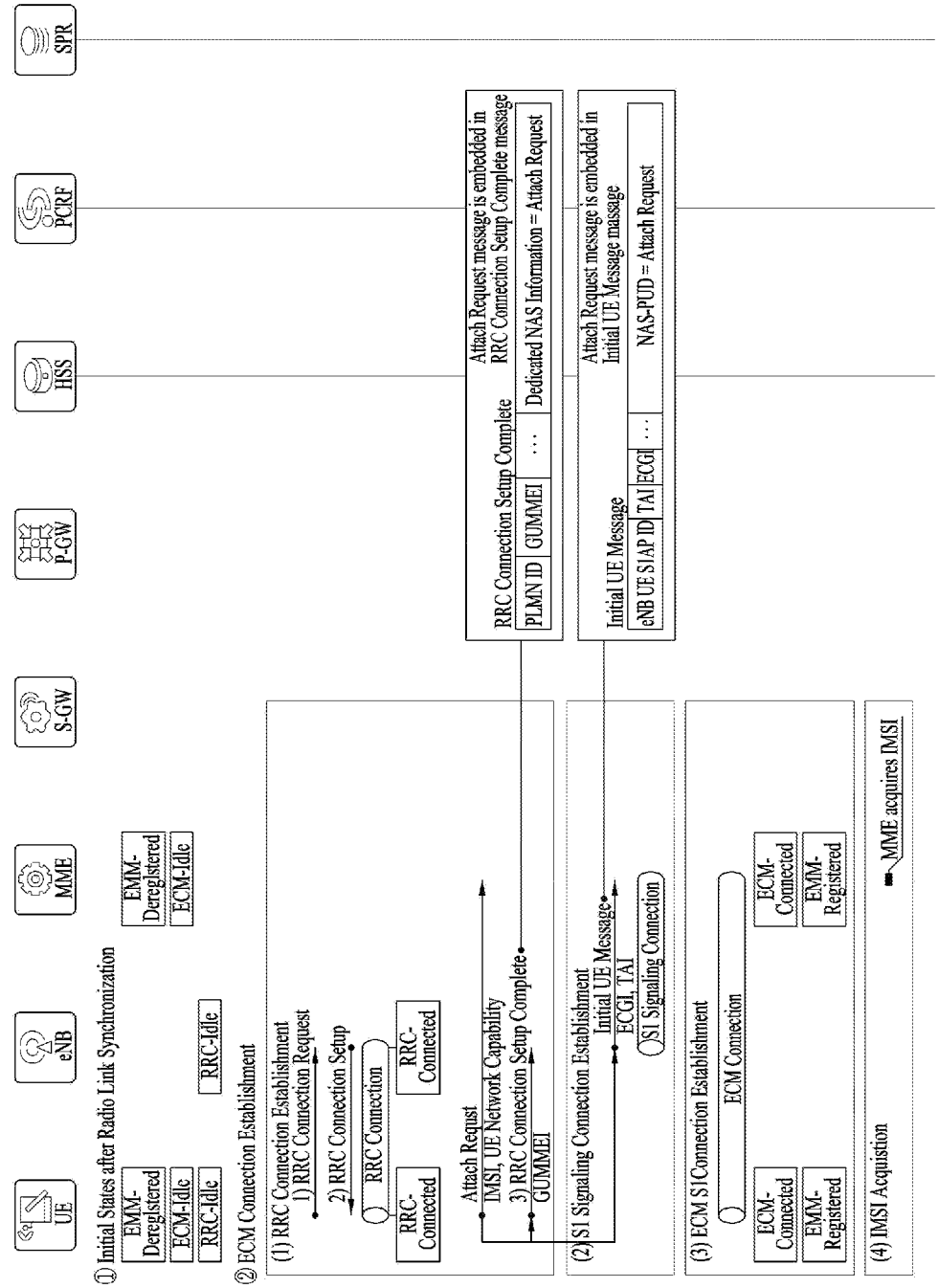
FIG. 5 is an exemplary diagram for explaining an initial access procedure of a user equipment in LTE system.

FIG. 5 is an exemplary diagram for explaining an initial access procedure of a user equipment in LTE system.

Referring to FIG. 5, a user equipment (UE) performs ECM connection establishment after a radio link is synchronized. To this end, the UE transmits an RRC connection establishment request message to a base station. In this case, the RRC connection request (establishment cause="Mobile Originating Signaling") message is transmitted via an SRB 0, which is commonly used by user equipments, and a CCCH corresponding to a logical channel. The UE receives an RRC connection setup message in response to the RRC connection request message. In this case, an SRB configuration resource, which is to be dedicatedly used by the UE, can be allocated in a manner of transmitting the RRC connection setup message via the SRB 0, which is commonly used by user equipments, and the CCCH corresponding to a logical channel. Subsequently, RRC connection is performed.

The UE transmits an attach request and an RRC connection setup complete message. The UE transmits the RRC connection setup complete message to the base station via an SRB 1 and a DCCH (dedicated control channel) and the RRC connection setup complete message is transmitted in a manner of including an attach request NAS message in the RRC connection setup complete message. The base station assigns an eNB UE S1AP ID via an S1AP message in S1-MME interface for S1 signaling connection establishment and delivers an attach request to the MME via an initial UE message.

Figure 6:
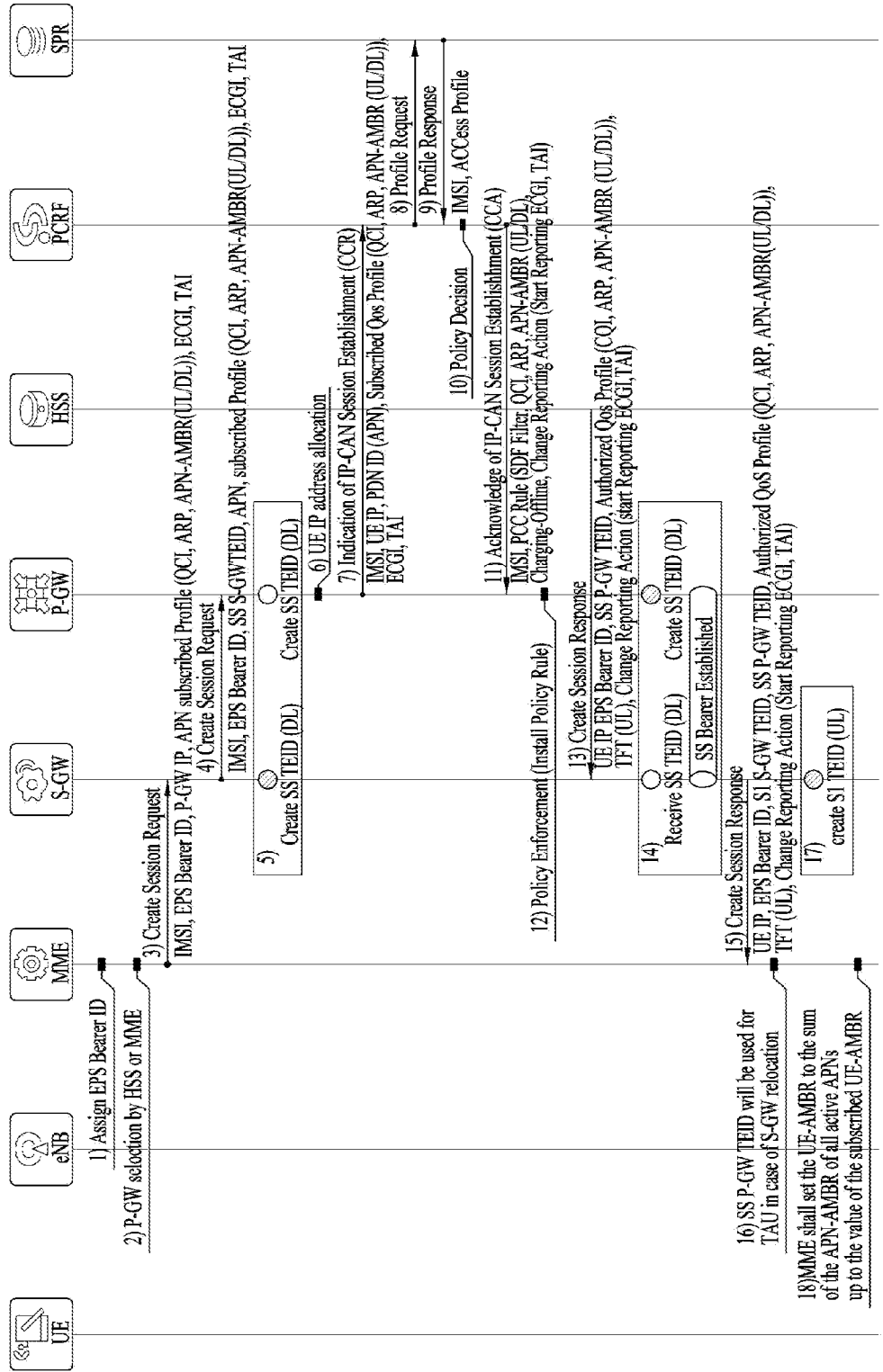
FIG. 6 is an exemplary diagram for specifically explaining an evolved packet system (EPS) session establishment procedure among an initial access procedure of a user equipment in LTE system.

FIG. 6 is an exemplary diagram for specifically explaining an EPS session establishment procedure among an initial access procedure of a user equipment in LTE system.

An MME establishes an EPS session and a default EPS bearer using user subscription information and allocates a network/radio resource to provide service quality subscribed by a user. In 18) a UE-AMBR calculation step of MME shown in FIG. 6, the MME calculates a UE-AMRB value to be transmitted to an eNB. The MME calculates the UE-AMBR within a range not exceeding the sum of APN-AMBR according to an APN and may be then able to assign the UE-AMBR.

Figure 7:
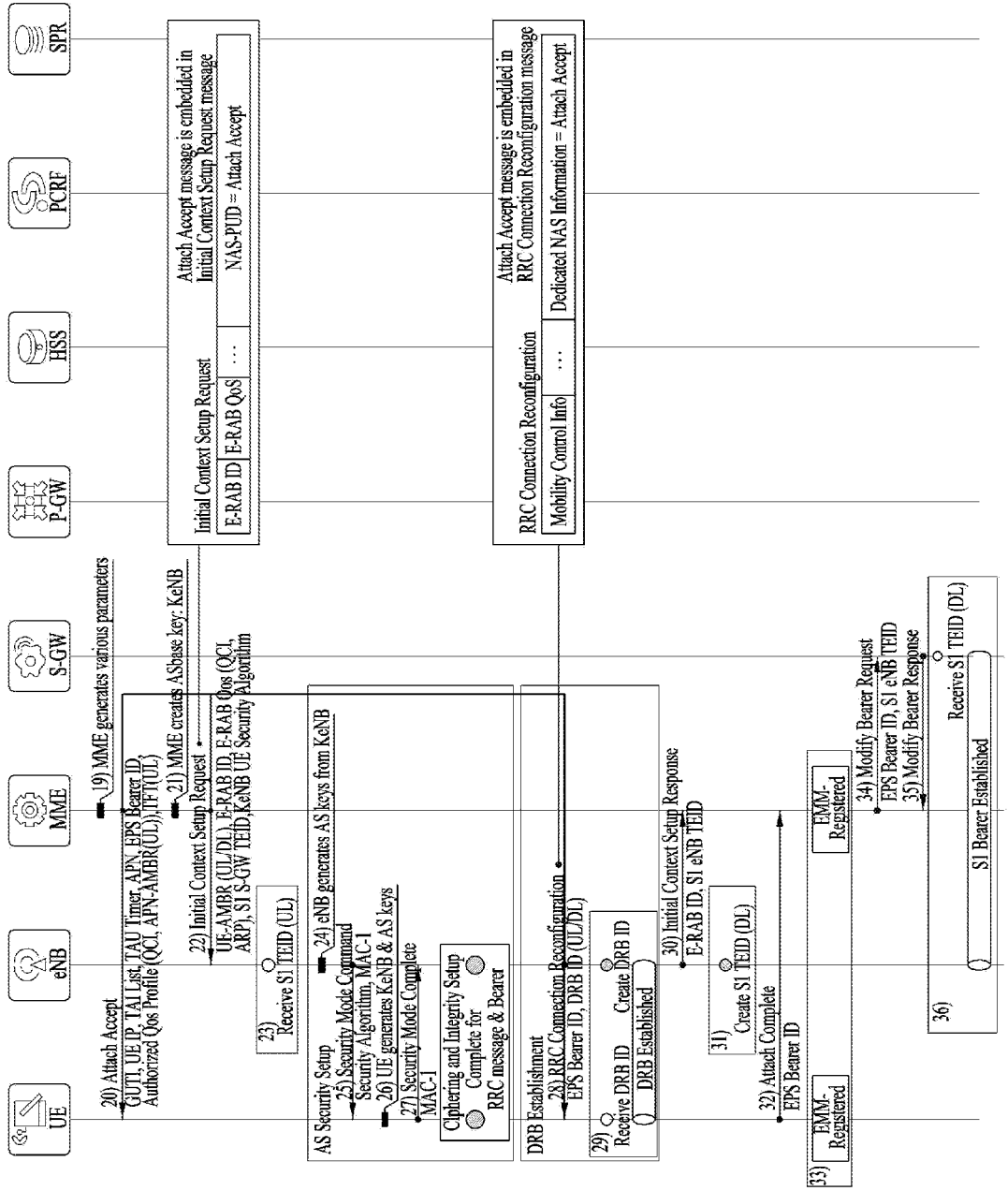
FIG. 7 is another exemplary diagram for specifically explaining an EPS session establishment procedure among an initial access procedure of a user equipment in LTE system.

FIG. 7 is another exemplary diagram for specifically explaining an EPS session establishment procedure among an initial access procedure of a user equipment in LTE system.

Referring to FIG. 7, an MME generates various parameters. The MME assigns a GUTI instead of IMSI to a UE. The MME determines a parameter related to TAU control (TAI list assignment, TAU timer value). The MME determines UE-AMBR to be used by the eNB and assigns E-RAB ID.

In 22) step of initial context setup request, UE-AMBR (UL/DL), E-RAB ID, E-RAB QoS, S1 S-GW TEID, KeNB, UE security algorithm are transmitted. The UE-AMBR (UL/DL) corresponds to a QoS parameter controlled by a base station only (since the UE-AMBR (UL/DL) is passing through an identical base station irrespective of an APN used by a user). The E-RAB ID corresponds to a value assigned by the MME. A base station uses the E-RAB ID as an EPS bearer ID. The E-RAB QoS is configured by the MME based on an EPS bearer QoS received from a P-GW. The S1 S-GW TEID corresponds to a UL S1 TEID value received from an S-GW. The KeNB corresponds to a value calculated by the MME from KASME. The base station deducts an AS security key from the KeNB. The UE security algorithm corresponds to a value received from a UE via an attach request message. The UE security algorithm enables the base station to perform AS security setup together with the KeNB. A NAS-PDU corresponds to a NAS message (attach accept).

In relation to DRB configuration of 28), a NAS layer of a UE obtains UE IP address and GUTI in a manner of receiving an RRC connection reconfiguration message and performs communication using the UE IP address and the GUTI.

In the following, a network structure that a plurality of communication systems according to the present invention are interworking with each other is explained.

Figure 8:
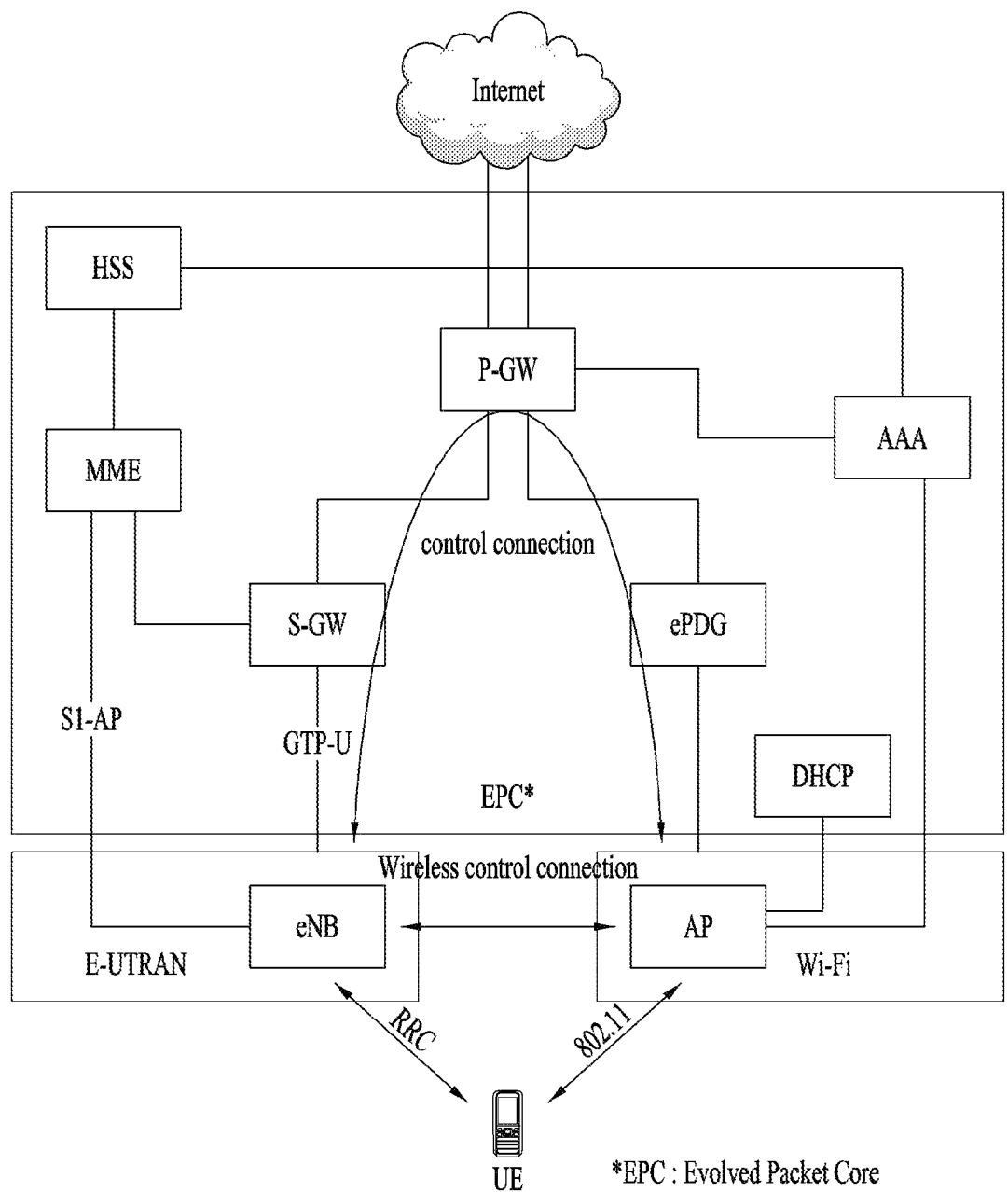
FIG. 8 is a diagram for an example of a network structure for explaining an interworking structure between a first communication system (e.g., LTE system) and a second communication system (e.g., Wi-Fi system)

FIG. 8 is a diagram for an example of a network structure for explaining an interworking structure between a first communication system (e.g., LTE system) and a second communication system (e.g., Wi-Fi system).

In a network structure shown in FIG. 8, there may exist a backhaul control connection between an AP and an eNB or a wireless control connection between the AP and the eNB via a backbone network (e.g., P-GW or EPC (evolved packet core)). For a peak throughput and data traffic off-loading, a UE can support both a first communication system (or a first communication network) using a first wireless communication scheme and a second communication system (or a second communication network) using a second wireless communication scheme at the same time via interworking among a plurality of communication networks. In this case, the first communication network or the first communication system is called a primary network or a primary system, respectively. The second communication network or the second communication system can be called a secondary network or a secondary system, respectively. For instance, the UE can be configured to support LTE (or LTE-A) and WiFi (short range communication system such as WLAN/802.11) at the same time. This sort of UE can be called a multi system supporting UE (multi-system capability UE) and the like.

In the network structure shown in FIG. 8, a primary system may correspond to a network of wide coverage and the network for transmitting control information. Examples for the primary system may include WiMAX or LTE (LTE-A) system. Meanwhile, a secondary system corresponds to a network of small coverage and a system for transmitting data. For instance, the secondary network may correspond to WLAN or a wireless LAN system such as WiFi.

The present invention is explained under an assumption that follows.

Assume that an entity for controlling interworking corresponds to an entity belonging to a cellular network and assume that an interworking function is implemented in three entities described in the following.

First, legacy e-NB can be reused (reuse existing entity).

Second, legacy MME (Mobility Management Entity) can be reused (reuse existing entity).

Third, IWME (Interworking Management Entity) is newly defined (define new entity).

An interworking function is associated with an interworking-related procedure capable of being occurred between an eNB and a UE or between an eNB and an AP and an entity for controlling interworking stores/manages AP information. An eNB/MME/IWME store/manage information of APs belonging to coverage of the eNB/MME/IWME.

Assume that a connection is established on a radio link between an AP corresponding to an access point of a secondary system (e.g., WiFi) and a base station (eNB) corresponding to an access point of a primary system (e.g., LTE system or a cellular communication system such as WiMAX). In the present invention, an AP including a wireless interface with an eNB is called an eAP. In particular, the eAP should support not only 802.11 MAC/PHY but also LTE protocol stack or WiMAX protocol stack for communication with an eNB. The eAP plays a role of a UE. This means that the eAP can communicate with an eNB.

Figure 9:
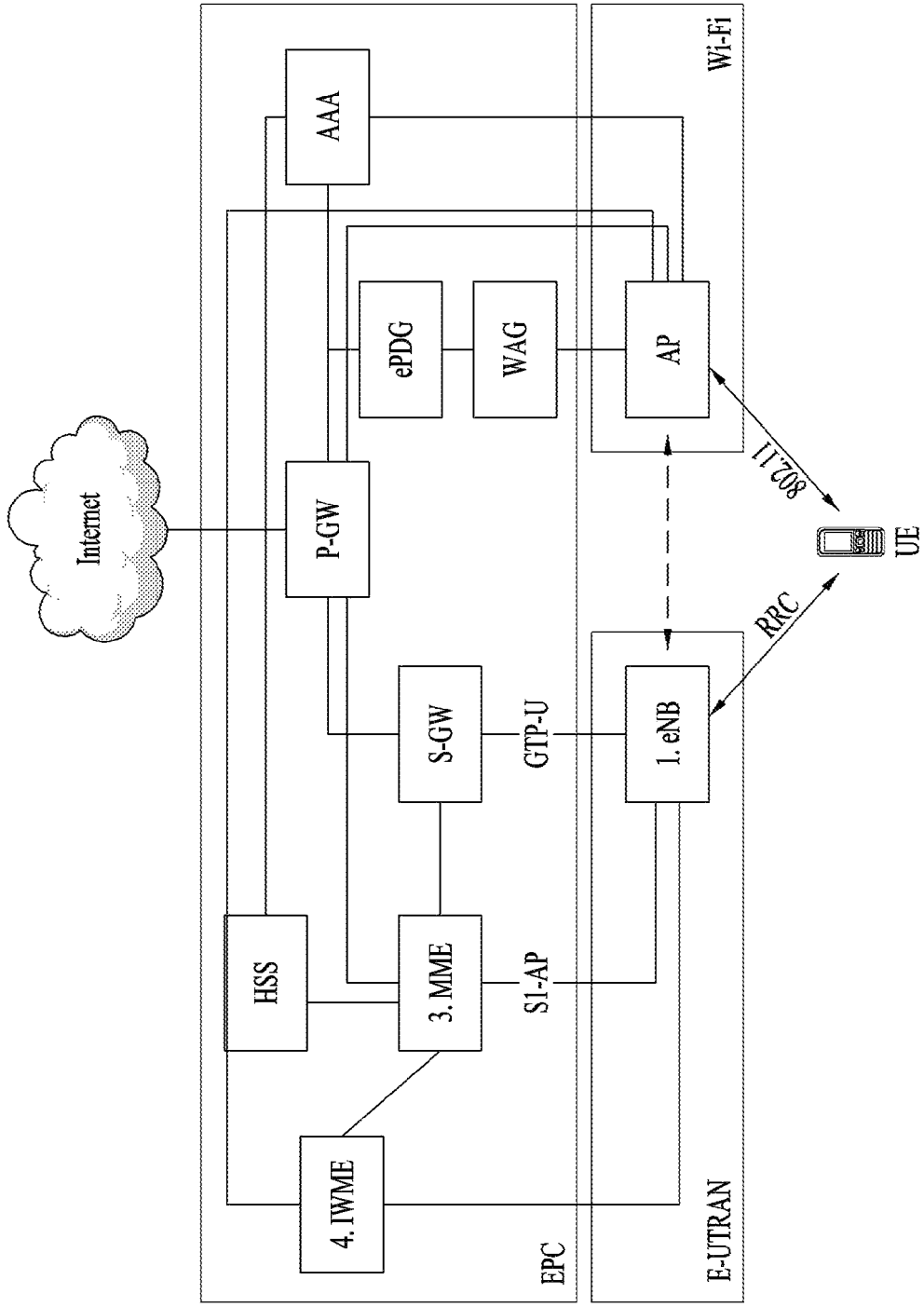
FIG. 9 is an exemplary diagram for a network structure of WiFi-cellular interworking according to the present invention.

FIG. 9 is an exemplary diagram for a network structure of WiFi-cellular interworking according to the present invention.

According to a technology of the present invention, in environment at which a user equipment capable of transmitting and receiving WiFi and a cellular network at the same time exists, in order for the multi-RAT user equipment to more efficiently use a dual mode or a WiFi-cellular convergence network, a cellular network can manage information of an AP according to 4 methods described in the following.

Method 1. Use of air interface between an eNB and an AP

An eNB controls an AP in a manner of being similar to a method of controlling a normal UE using a wireless control connection with the AP.

Method 2. Use of backhaul interface between an eNB and an AP

An eNB controls an AP using a wireless control connection with the AP.

Method 3. Use of control interface between an MME and an AP

An AP is controlled using a control connection between an MME and the AP (i.e., a secondary system).

Method 4. Use of control interface between an IWME and an AP

An AP is controlled using a control connection between an IWME and the AP (i.e., a secondary system).

Figure 10:
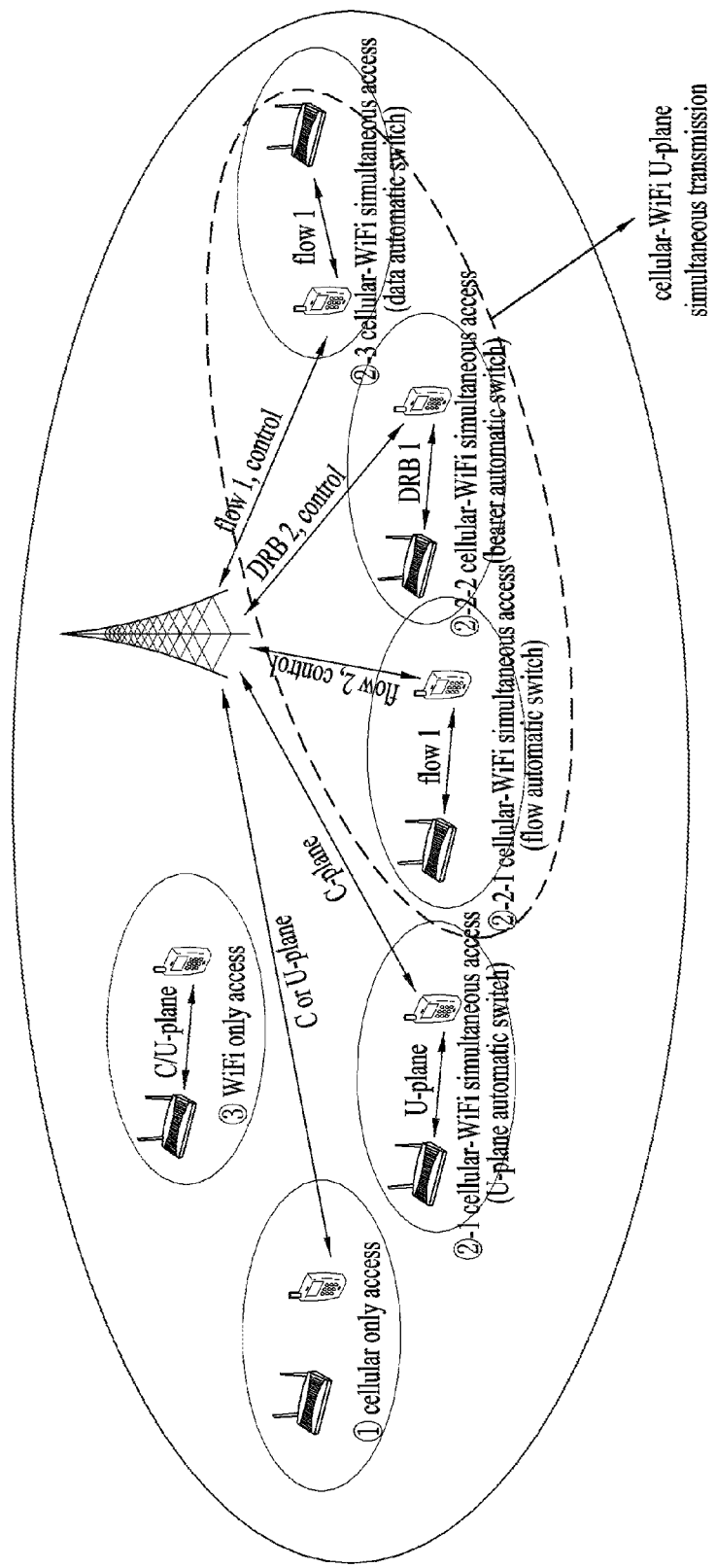
FIG. 10 is an exemplary diagram for explaining a scenario of a WiFi-cellular convergence network.

FIG. 10 is an exemplary diagram for explaining a scenario of a WiFi-cellular convergence network.

① scenario of FIG. 10 is a cellular only access scenario of a UE. In order for a UE to perform WiFi automatic switching/simultaneous transmission in a state that the UE accesses a cellular network only, it is required to define a technology in advance. AP information management for interworking is performed in a network level (cellular-WiFi) and WiFi discovery and WiFi network access are performed in a device level (cellular—device—WiFi). ②-1 to ②-3 show WiFi automatic switching of a user plane (U-plane) between cellular and WiFi, WiFi automatic switching of a flow, WiFi automatic switching of a bearer and WiFi automatic switching of data, respectively. If cellular-WiFi U-plane is automatically switched according to ②-1, all data are transmitted via WiFi only. If cellular-WiFi U-plane is switched to be transmitted at the same time according to ②-2 and ②-3 scenario, data can be transmitted at the same time via both WiFi and a cellular network using a bandwidth segregation or aggregation technique. In this case, as shown in ②-2, the bandwidth segregation corresponds to automatic switching according to a flow (service/IP flow). Flows different from each other are transmitted via RATs different from each other. In the ②-2, automatic switching according to a flow may correspond to one or more service/IP flow(s). In particular, the automatic switching may correspond to switching in a flow unit (②-2-1) or switching according to a data radio (or EPS) bearer (②-2-2). As shown in ②-3, although flows are identical to each other, the bandwidth aggregation enables data to be transmitted via RATs different from each other in data unit.

As shown in the ② scenario, if WiFi automatic switching is completed, it is able to perform WiFi-based cellular link control as shown in ③ scenario. Cellular link-related paging or control on a radio link failure can be received via a WiFi link.

Method of Searching for Base Station in a Plurality of Communication Systems

Figure 11:
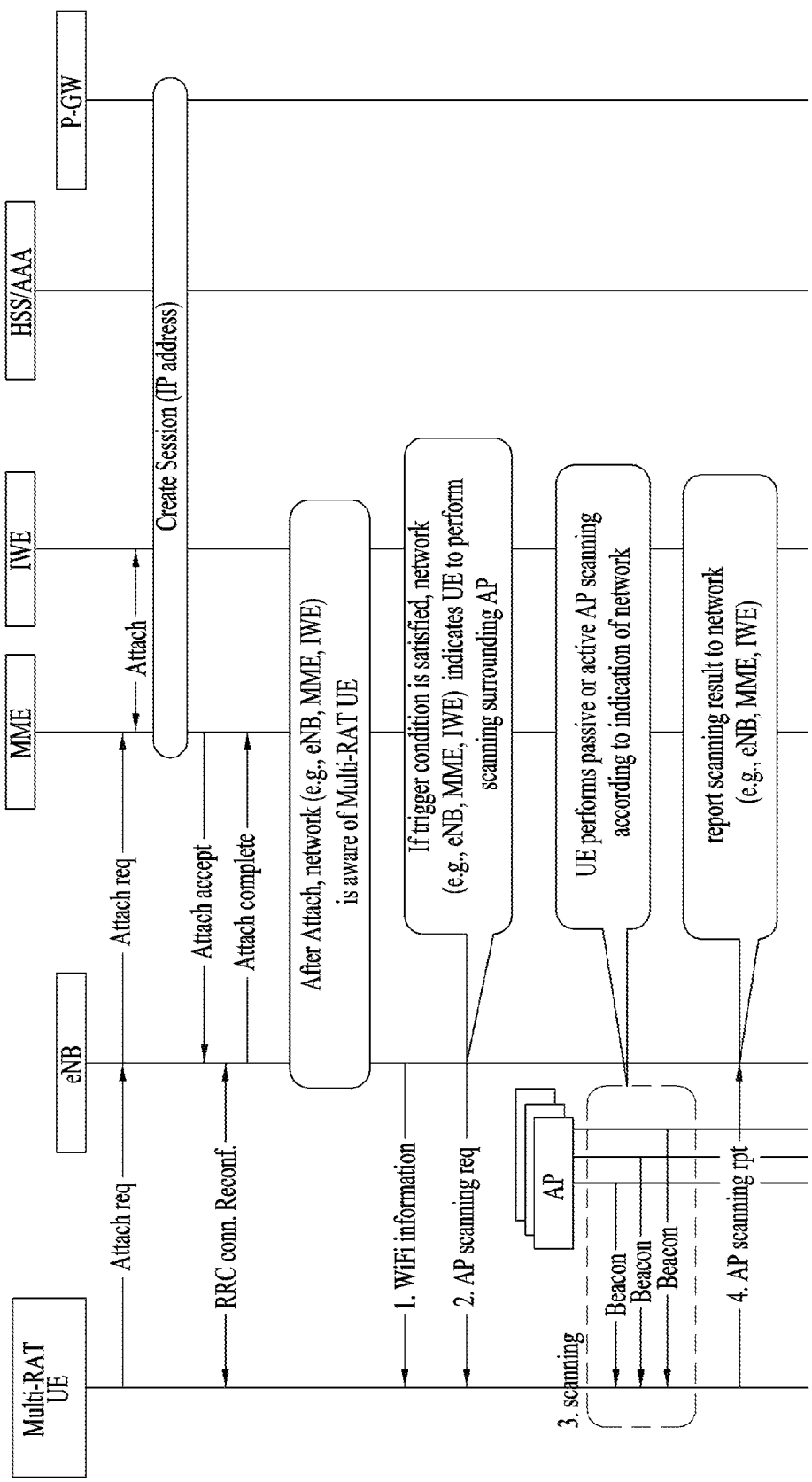
FIG. 11 is a flowchart for an example of a method of searching for an access point in a plurality of communication systems according to the present invention.

FIG. 11 is a flowchart for an example of a method of searching for a base station in a plurality of communication systems according to the present invention.

According to the present invention, when a network receives information on a secondary system (e.g., discovery, scanning etc.) of a user equipment and indicates to access a specific AP based on the received information, the present invention may be able to provide a procedure necessary between the network and the user equipment. In performing the procedure, if discovery or scanning is failed, it may be able to provide fault reporting or a fall back procedure.

Referring to FIG. 11, a multi-RAT UE transmits an attach request to an MME via an eNB. The MME performs an access procedure with an IWE. Subsequently, the MME, the IWE, an HSS/AAA and a P-GW create a session including an IP address. Subsequently, the MME transmits an attach accept to the eNB. The eNB establishes or reestablishes RRC connection with the multi-RAT UE and informs the MME of completion of access. In this case, a network (e.g., the eNB, the MME, the IWE, etc.) can recognize the multi-RAT UE after the access is completed.

After the multi-RAT UE is recognized by the network, an AP search step according to the present invention can be explained by steps ranging from a first step to a fourth step. In the first step, the eNB transmits Wi-Fi information to the multi-RAT UE. In the second step, if a trigger condition of AP scanning is satisfied, the network (e.g., the eNB, etc.) transmits an AP scanning request to the UE to make the UE scan a surrounding AP. In the third step, the UE receives a beacon of the surrounding AP according to an indication of the network and performs active AP scanning or passive AP scanning. In the fourth step, the UE reports a result of the scanning to the network (e.g., the eNB, etc.).

In the following, each step of the steps ranging from the first step to the fourth step shown in FIG. 11 is explained in detail.

First of all, in the first step of FIG. 11, WiFi (AP) information is transmitted.

A parameter transmitted in the first step can include AP center frequency channel information (if there exist one or more channel information, one or more channel information), a beacon frame cycle (if a beacon frame is different from each other according to a channel, a beacon frame is transmitted on every channel), AP version information and provision service information of an AP. In this case, the provision service information of the AP may also transmit information on a service provided by the AP together in case that 802.11aq (pre-association discovery) is supported.

A method of transmitting a message in the first step is explained in detail in the following.

A first method of transmitting a message is to use broadcast transmission. Information on all APs belonging to coverage of a base station can be periodically transmitted to a UE.

A second method of transmitting a message is to use unicast transmission. If a network identifies a location of a UE, the network can transmit information on APs around the UE to the UE. In this case, it may use a periodical scheme or an event-triggered scheme. If a message is transmitted using the event-triggered scheme, the message may be identical to a scanning request message.

A method of configuring an AP list in the first step is explained in the following.

A first method of configuring the AP list is to use a white list. If a network is aware of WLAN status information (e.g., load status, interference, etc.) in advance, the network may transmit information on a specific channel preferred to access only on the basis of determination of the network. In this case, a UE can scan an AP belonging to a corresponding list only or may report information on the AP only to the network.

A second method of configuring the Ap list is to use a black list. If a network is aware of WLAN status information (e.g., load status, interference, etc.) in advance, the network may transmit information on a specific channel unable to access on the basis of determination of the network. In this case, although an AP belonging to a corresponding list is scanned, a UE may not report information on the AP to the network. Or, the UE may not scan the AP belonging to the list, if possible.

Subsequently, WiFi (AP) scanning is requested in the second step of FIG. 11.

In case of a multi-RAT UE, battery consumption of the multi-RAT UE is greater than battery consumption of a legacy single-RAT UE. In order to minimize the battery consumption of the multi-RAT UE, WiFi scanning is initiated by an indication of a network (e.g., such an interworking entity as the eNB, the MME, the IWE).

Examples of a trigger condition of the WiFi (AP) scanning determined by the network may include (1) generation of a specific data flow (data bearer) preferred to be transmitted via WiFi, (2) increase of data load of a cellular network, (3) movement of a UE based on a location of the UE (e.g., UE moving toward a cell edge or an AP density area, and (4) cellular network signal strength decrease of a UE (e.g., signal strength decrease due to indoor or jamming area). Besides the four examples mentioned above, the trigger condition of the WiFi scanning can be randomly determined by an operator. For clarity, the aforementioned four examples are described in the present specification.

If the aforementioned trigger condition is satisfied, the network managing the interworking can indicate the UE to search for a different RAT. In this case, the search of the different RAT may correspond to an AP scanning procedure. And, in case of searching for a legacy WiFi system, the UE receives a beacon message broadcasted by an AP using the first method or transmits a probe request message and receives a probe response message using the second method to search for the legacy WiFi system.

When a beacon message is received according to the first method (passive scanning), if a different STA occupies a media on the time of transmitting a beacon using a periodically broadcasted message by each of APs, transmission of a beacon message waits until the media becomes an idle state. When the media becomes the idle state, the beacon message can be transmitted at that time.

In case of transmitting a probe request/response message using the second method, the probe request message can be transmitted using a broadcast ID or a specific ID. If a list of a specific AP is transmitted from a network, a probe response message can be received in a manner of transmitting a probe request message to the specific AP (specific ID).

Parameters transmitted in the second step of FIG. 11 are explained in the following.

First of all, a parameter transmitted in the second step can include a surrounding AP list based on a location of a UE or a specific AP list only. In this case, the AP list can include an AP ID such as SSID/BSSID. If the specific AP list is transmitted, there may exist an AP preferred by a UE (e.g., a personal/specific group AP used in home or company) around the UE and a list of the preferred AP can be transmitted for example.

Subsequently, the parameter transmitted in the second step can include a relevant parameter capable of assisting AP scanning together with an AP list or a specific AP ID. The relevant parameter may correspond to AP center frequency channel information (including a case of including one or more channel information). And, the relevant parameter may correspond to information on an AP of which load is equal to or less than a threshold on the basis of WLAN load information or load information. And, the relevant parameter may correspond to a beacon frame interval and transmission timing. When a beacon frame is transmitted on timing different from each other according to a channel, the relevant parameter can notify a beacon frame interval and transmission timing according to a channel. And, the relevant parameter can include AP version information (e.g., 802.11a, g, n, ai, ac, af, aq, etc.). and, the relevant parameter can include AP service information (e.g., in case of 802.11aq, information on a provided printer service).

Subsequently, the parameter transmitted in the second step can include measurement duration. Hence, a UE can perform WiFi scanning during a corresponding interval.

Subsequently, the parameter transmitted in the second step can include a reporting waiting timer. When a WiFi scanning request message is transmitted, a network initiates the timer and a UE initiates the timer when the WiFi scanning request message is received. The UE reports a scan result to the network before the timer is expired.

Subsequently, the parameter transmitted in the second step can include a scan fault reporting request (1 bit). When scanning fails, it may be able to make a request to an eNB (e.g., a cellular network) to transmit information on a failed AP.

Subsequently, the parameter transmitted in the second step can include a scan result reporting trigger condition. In particular, it may be able to define a scanning result to be reported to a network only when a measurement value of APs scanned by a UE satisfies a specific condition. In this case, the value can be transmitted via a WiFi scanning request message.

Figure 12:
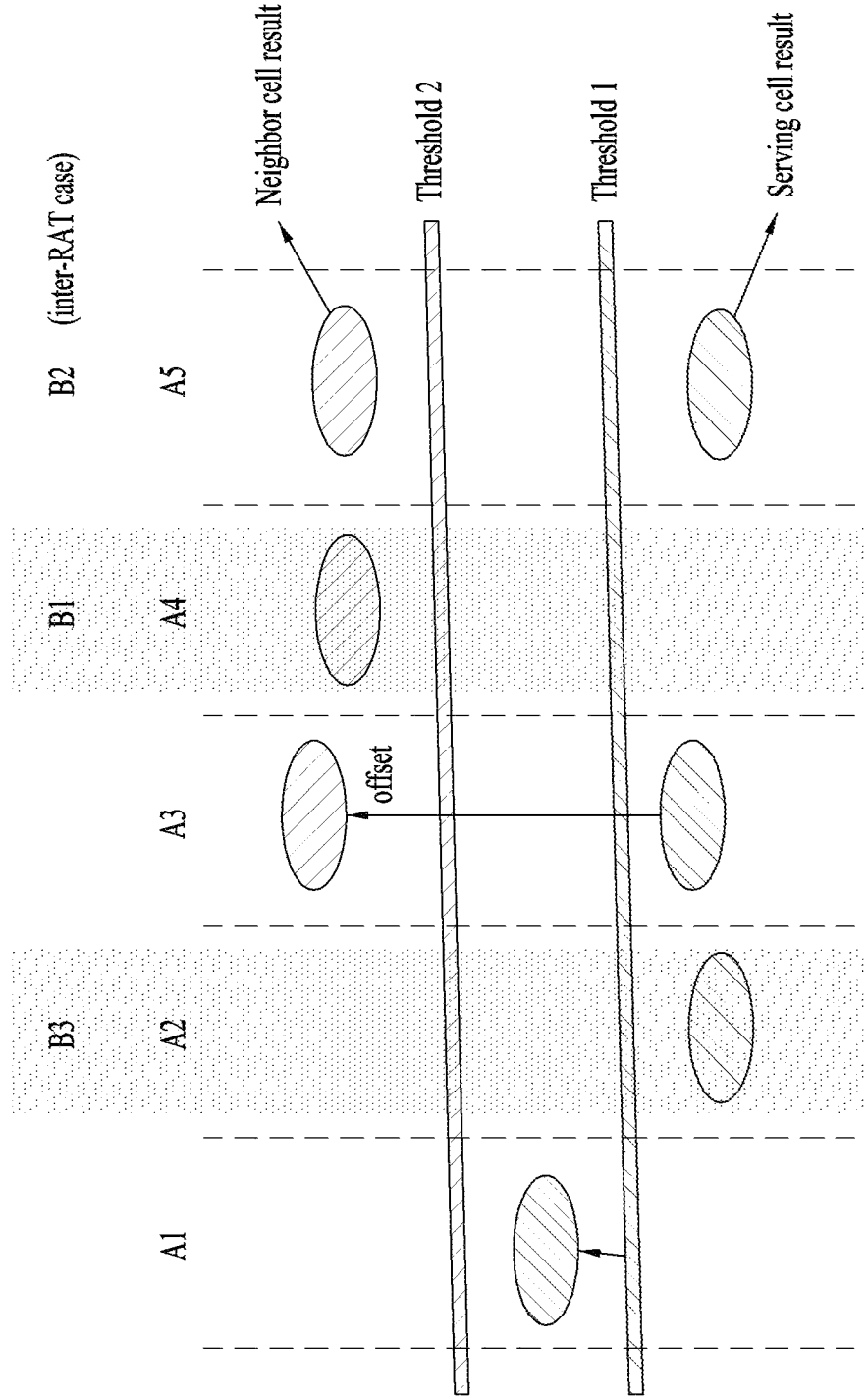
FIG. 12 is a diagram for an example of inter-RAT measurement report trigger conditions.

FIG. 12 is a diagram for an example of inter-RAT measurement report trigger conditions.

An event A1 indicates that a serving cell result is higher than a threshold 1. An event A2 indicates that a serving cell result is lower than the threshold 1. An event A3 indicates that a neighbor cell result is higher than a serving cell as much as an offset. An event A4 indicates that a neighbor cell result is higher than a threshold 2. An event A5 indicates that a serving cell result is lower than the thresholds 1 and a neighbor cell result is higher than the threshold 2. An event B1 indicates that an inter-RAT neighbor cell result is higher than the threshold 2. An event B2 indicates that a serving cell result is lower than the threshold 1 and an inter-RAT neighbor cell result is higher than the threshold 2. An event B3 indicates that an inter-RAT serving cell result is lower than the threshold 1.

Referring back to FIG. 11, WiFi (AP) scanning is performed in the third step.

Figure 13:
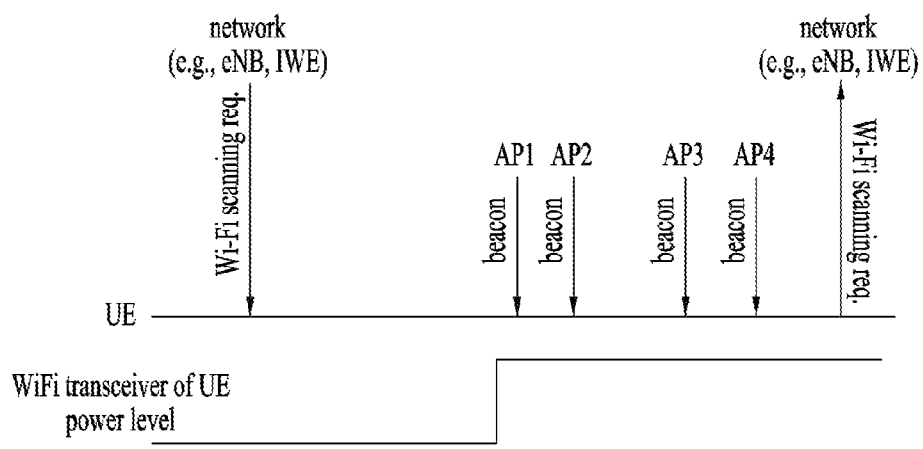
FIG. 13 is a diagram for an example of operating a Wi-Fi transceiver.
Figure 14:
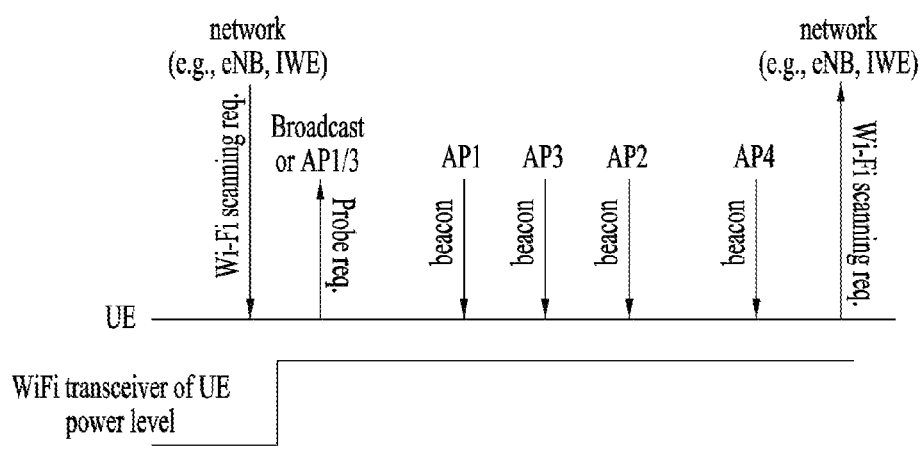
FIG. 14 is a diagram for a different example of operating a Wi-Fi transceiver.

In the third step of FIG. 11, having received a WiFi scanning request message, a UE initiates surrounding WiFi scanning based on information of the message. In this case, a first method of determining timing of turning on a transceiver is shown in FIG. 13. Referring to FIG. 13, the transceiver is turned on based on timing of transmitting a beacon frame of an AP of which beacon frame transmission timing is earliest among APs, which have transmitted a beacon frame. And, a second method of determining timing of turning on a transceiver is shown in FIG. 14. Referring to FIG. 14, a WiFi transceiver is turned on immediately after a WiFi scanning request message is received and it may be able to start WiFi scanning (e.g., in case of active scanning).

In the third step of FIG. 11, if scanning is successfully performed, a signal strength measurement value (RSSI) for a scanned AP ID (SSID or BSID) and the like can be transmitted. In this case, if one or more AP lists are reported, the AP lists can be transmitted in an order of power strength or a preferred AP. And, if scanning is successfully performed, it may be able to transmit AP center frequency channel information. In this case, if the information includes one or more channel information, it may be able to select and transmit a preferred channel based on the channel information.

In the third step of FIG. 11, an AP, which has successfully performed scanning, can be defined as follows.

(1) A case of detecting an AP included in an AP list transmitted from a WiFi scanning request message (receiving a beacon or a short signal notifying existence of an AP).

(2) A case that signal strength of a detected AP is equal to or greater than a specific threshold.

(3) A case that a detected AP is accessible (an AP sharing security information or an open security AP).

In the third step, an AP, which has failed to perform scanning, can be defined as follows.

(1) A case that there is no detected AP, for instance, a case of not receiving a beacon message within measurement duration.

(2) A case of not detecting an AP included in an AP list transmitted from a WiFi scanning request message, for instance, a case of not receiving a beacon message for an AP indicated by a network within measurement duration.

(3) Although an AP included in an AP list transmitted from a WiFi scanning request message is detected, a case that signal strength is equal to or less than a specific threshold.

(4) Although an AP included in an AP list transmitted from a WiFi scanning request message is detected and signal strength is equal to or greater than a specific threshold, a case that accessing the AP is not feasible due to a security setting.

(5) Although an AP included in an AP list transmitted from a WiFi scanning request message is detected and signal strength is equal to or greater than a specific threshold, a case that a noise level is equal to or greater than a specific threshold.

(6) Although an AP included in an AP list transmitted from a WiFi scanning request message is detected and signal strength is equal to or greater than a specific threshold, a case that synchronization is not matched with each other.

Referring back to FIG. 11, WiFi (AP) scan result reporting is performed in the fourth step.

First of all, a successfully performed scanning case is explained in the following.

A UE transmits a scanning result value of an AP, which is determined as being successfully scanned, to an eNB (or an interworking entity) via a WiFi scan result report message.

If there is no separate WiFi scan fault report message, information indicating that a message (reporting) type is success can be included in the corresponding message. And, the corresponding message can include AP cell ID (SSID or BSID), a signal strength measurement value (RSSI) and the like. In case of transmitting one or more AP lists, the corresponding message can be transmitted in an order of power strength or a preferred AP. And, the corresponding message can include AP center frequency channel information. If the corresponding message includes one or more channel information, it may be able to select and transmit a preferred channel based on the one or more channel information.

Subsequently, a case of fail in scanning is explained in the following. In this case, the fail in scanning can be reported in a form of a WiFi scan result report or a WiFi scan fault report.

A UE transmits a scanning result value of an AP, which is determined as being failed in scanning, to an eNB (or an interworking entity) via a WiFi scan result report message. In this case, when a scan fault reporting request is defined in a WiFi scan request message, if a corresponding bit is set to 1, the UE transmits the WiFi scan result report message.

The message may transmit a value described in the following. The message can be transmitted by a request of a cellular network. Or, a UE can transmit the message using an unsolicited scheme. If there is no separate WiFi scan fault report message, information indicating that a message (reporting) type is fail can be included in the message.

Causes of failing in scanning are described in the following.

(1) A case of beacon detection failure, i.e., a case that there is no detected (received) beacon (or probe response) message. For instance, a case that there is no AP in an AP list indicated by a cellular or a case that there is no detected AP. In this case, it may be able to transmit BSSID/SSID of an AP, which has not received a beacon message, among an AP list detected from an eNB.

(2) A case of no accessible AP, i.e., although there is a detected (received) beacon (or probe response) message, access is not feasible (due to security issue and the like). In this case, a reason of not access can be transmitted. For instance, such a reason as no security information, no supportable channel, no synchronization or the like can be transmitted.

(3) A case of low signal strength. Although there is an AP in which a beacon (or probe response) message is detected (received), if signal strength is lower than a specific threshold, it may be able to transmit signal strength (RSSI) measured from each AP.

Figure 15:
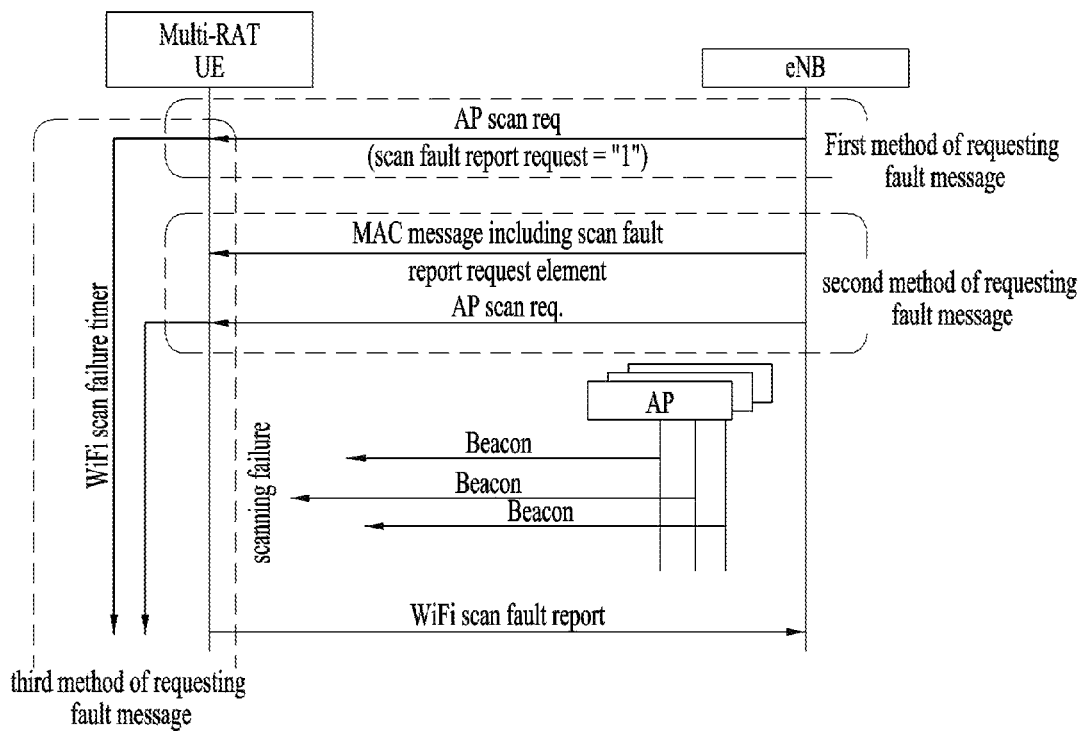
FIG. 15 is a flowchart for an example of a method of transmitting a Wi-Fi scan fault report.

FIG. 15 is a flowchart for an example of a method of transmitting a Wi-Fi scan fault report.

Referring to FIG. 15, first of all, a WiFi scan fault report can be transmitted by a request of an eNB. The eNB can make a request for transmission of the WiFi scan fault report via a WiFi scan fault report request field (the method of requesting the first fault message mentioned earlier in FIG. 15) of an RRC message (e.g., WiFi scan request).

Or, the eNB can make a request for transmission of the WiFi scan fault report in a manner of defining a new WiFi scan fault report request MAC control elements (the second method of requesting the fault message mentioned earlier in FIG. 15). In this case, the WiFi scan fault report request MAC control elements can be added to a MAC header when a MAC message is transmitted to a UE. In particular, as shown in Table 1 in the following, a new LCID of "WiFi scan fault report request" can be defined in "Values of LCID for DL-SCH".

TABLE

| Index | LCID values |
| --- | --- |
| 00000 | CCCH |
| 00001-01010 | Identity of the logical channel |
| 01011-11010 | Reserved |
| 11011 | (WiFi) scan fault report request |
| 11100 | UE Contention Resolution Identity |
| 11101 | Timing Advance Command |
| 11110 | DRX Command |
| 11111 | Padding |

When an eNB makes a request for a fault message to a UE using one of the first and the second fault message requesting method, the UE can transmit a WiFi scan fault report message to the eNB.

Or, as a third method of requesting a fault message, a WiFi scan fault report can be transmitted by a WiFi scan failure timer. If a WiFi scan request message is received from a network (e.g., eNB), a UE initiates the WiFi scan failure timer. A value of the timer can be configured by an eNB in the WiFi scan request message. If a WiFi scan result report message (e.g., a scan result report message for notifying success of scanning when one or more APs to report a scanning result value are detected) is not transmitted until the timer is expired, the UE transmits the WiFi scan fault report message to the network.

Meanwhile, a WiFi (AP) scan stop method is explained in the following. In particular, it may be able to define a procedure for making a multi-RAT UE stop performing WiFi scanning.

When WiFi scanning is performed by an indication of a network, it may be able to define a procedure for terminating WiFi scanning and turning off a WiFi transceiver of a UE.

In case of receiving a WiFi scan fault report message from the UE, the procedure can be used as a method of minimizing battery consumption of the UE.

In case of receiving a WiFi scan fault report message from the UE, a network can transmit a WiFi scan request message consisting of a different AP list to the UE again. If the network continuously receives the WiFi scan fault report message from an identical UE as many as MAX scan retrial numbers, the network can indicate the UE not to perform WiFi scanning anymore to minimize battery consumption of the UE.

As a first example of the WiFi (AP) scan stop method, there is explicit signaling for requesting WiFi scan stop. The network can transmit WiFi scan stop signaling to the UE as a meaning of terminating WiFi scanning and turning off a WiFi transceiver. As a concrete example of the signaling method, there may exist (1) definition of a new WiFi scan stop message, (2) definition of a new WiFi scan stop MAC control element, (3) definition of a WiFi scan stop field in an MAC control ack message for a WiFi scan fault report message and the like.

As a second example of the WiFi (AP) scan stop method, there is implicit signaling. The network defines a WiFi scan MAX retrial number field in such a scanning-related message as a WiFi scan request message for requesting scanning to the UE. If a WiFi scan fault report continuously occurs from the UE as many as WiFi scan MAX retrial numbers, the UE does not perform WiFi scanning anymore and turns off a WiFi transceiver. And, if the network continuously receives the WiFi scan fault report from the UE as many as WiFi scan MAX retrial numbers, the network is able to know that the UE does not perform WiFi scanning anymore.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, embodiments of the present invention are described centering on the data transmission/reception relations between a base station and a terminal. In this disclosure, a specific operation explained as performed by a base station may be performed by an upper node of the base station in some cases. In particular, in a network constructed with a plurality of network nodes including a base station, it is apparent that various operations performed for communication with a terminal can be performed by a base station or other networks except the base station. Moreover, in this document, 'base station (BS)' may be substituted with such a terminology as a fixed station, a Node B, an eNode B (eNB), an access point (AP) and the like. And, 'terminal' may be substituted with such a terminology as a user equipment (UE), a mobile station (MS), a mobile subscriber station (MSS), and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

The present invention can be used for a wireless communication device such as a user equipment, a relay, a base station and the like.

What is claimed is:

1. A method of searching for a base station by a user equipment in a plurality of communication systems, the method comprising:
receiving, by a user equipment which has accessed a first communication system, information on at least one or more second base stations of a second communication system from a first base station of the first communication system,
when a search start condition is satisfied, receiving a search request message for initiating a search for the at least one or more second base stations from the first base station;
searching for the at least one or more second base stations based on the search request message; and
when a result of the searching corresponds to a failure, transmitting a failure report message including information on a cause of the failure to the first base station,
wherein the information on the cause includes at least one of a first cause and a second cause, the first cause corresponds to a beacon search failure, the second cause corresponds to base station inaccessibility,
wherein when the information on the cause corresponds to the first cause, the user equipment transmits an identifier of a base station associated with the beacon search failure to the first base station.

2. The method of claim 1, wherein when the information on the cause corresponds to the second cause, the user equipment selects one sub cause from sub causes including a 2-1 sub cause, a 2-2 sub cause and a 2-3 sub cause, and transmits the selected sub cause, and wherein the 2-1 sub cause corresponds to non-existence of security information, the 2-2 sub cause corresponds to non-existence of a channel capable of being supported and the 2-3 sub cause corresponds to no synchronization.

3. The method of claim 1, wherein when the search request message is received, the user equipment initiates a search failure timer and when the search is not successful before the search failure timer is expired, the user equipment transmits the failure report message to the first base station.

4. The method of claim 1, wherein the search request message comprises information on a maximum number of search retries.

5. The method of claim 4, wherein when the number of failure report messages exceeds the maximum number of search retries, receiving a search stop message from the first base station.

6. The method of claim 1, when the result of the searching step corresponds to a success, the method further comprises transmitting a search result report message to the first base station.

7. The method of claim 6, wherein the search result report message comprises at least one of an identifier of a base station, a signal measurement value and base station center frequency information.

8. The method of claim 1, wherein the search request message comprises a 1-bit indicator indicating whether a search failure is reported.

9. The method of claim 1, wherein the search request message is transmitted using radio resource control (RRC) signaling.

10. A user equipment searching for a base station in a plurality of communication systems, the user equipment comprising:

a Radio Frequency (RF) unit; and a processor that:

controls the RF unit of the user equipment, which has accessed a first communication system, to receive information on at least one or more second base stations of a second communication system from a first base station of the first communication system, controls the RF unit to receive, from the first base station, a search request message for initiating a search for the at least one or more second base stations when a search start condition is satisfied, searches for the at least one or more second base stations based on the search request message, and controls the RF unit to transmit a failure report message including information on a cause of a search failure to the first base station when a result of the searching step corresponds to a failure, wherein the information on the cause includes at least one of a first cause and a second cause, the first cause corresponds to a beacon search failure, the second cause corresponds to base station inaccessibility, wherein when the information on the cause corresponds to the first cause, the user equipment transmits an identifier of a base station associated with the beacon search failure to the first base station.

11. The user equipment of claim 10, wherein when the search request message is received, the processor initiates a search failure timer and when the search is not successful before the search failure timer is expired, the processor controls the RF unit to transmit the failure report message to the first base station.

* * * * *